US010853364B2

(12) United States Patent
Vujic et al.

(10) Patent No.: US 10,853,364 B2
(45) Date of Patent: Dec. 1, 2020

(54) DIRECT TABLE ASSOCIATION IN IN-MEMORY DATABASES

(71) Applicant: Microsoft Technology Licensing, LLC, Redmond, WA (US)

(72) Inventors: Nikola Vujic, Belgrade (RS); Aleksandar Vujic, Belgrade (RS)

(73) Assignee: Microsoft Technology Licensing, LLC, Redmond, WA (US)

( * ) Notice: Subject to any disclaimer, the term of this patent is extended or adjusted under 35 U.S.C. 154(b) by 339 days.

(21) Appl. No.: 15/279,015

(22) Filed: Sep. 28, 2016

(65) Prior Publication Data

US 2018/0089266 A1 Mar. 29, 2018

(51) Int. Cl.
| | | |
|---|---|---|
| *G06F 16/00* | (2019.01) | |
| *G06F 16/2453* | (2019.01) | |
| *G06F 16/22* | (2019.01) | |
| *G06F 16/2455* | (2019.01) | |
| *G06F 16/23* | (2019.01) | |

(52) U.S. Cl.
CPC ........ *G06F 16/24537* (2019.01); *G06F 16/22* (2019.01); *G06F 16/2282* (2019.01); *G06F 16/2322* (2019.01); *G06F 16/2456* (2019.01); *G06F 16/24562* (2019.01)

(58) Field of Classification Search
CPC ............. G06F 17/30315; G06F 3/0673; G06F 17/30498; G06F 17/30321; G06F 17/30592; G06F 17/30504; H04L 67/01
See application file for complete search history.

(56) References Cited

U.S. PATENT DOCUMENTS

| 5,247,662 A | 9/1993 | Minemura et al. |
|---|---|---|
| 5,666,525 A | 9/1997 | Ross |
| 6,167,399 A | 12/2000 | Hoang |
| (Continued) | | |

FOREIGN PATENT DOCUMENTS

WO  WO-2016117739 A1 * 7/2016 ............. G06F 16/00

OTHER PUBLICATIONS

Li, et al., "Fast joins using join indices", In International Journal on Very Large Data Bases, vol. 8, Issue 1, Apr. 1999, pp. 1-24.

(Continued)

*Primary Examiner* — Augustine K. Obisesan
(74) *Attorney, Agent, or Firm* — Alleman Hall Creasman & Tuttle LLP

(57) ABSTRACT

To address the issue of latency in relational database systems, a computerized database management system comprising a database server, a processor, and associated random access memory is provided. The processor may configure an in-memory database in the random access memory to have tables, each containing a plurality of cells associated memory addresses, establish a direct table association between an origin cell and a target cell within the tables, receive a request to perform a join database operation of a first table including the origin cell on a second table including the target cell, dereference the direct table association for the origin cell to obtain a value of the target cell stored at the memory address for the target cell, execute the join database operation to produce a joined table including the value, and store the joined table at a new location in the random access memory.

15 Claims, 11 Drawing Sheets

(56) References Cited

U.S. PATENT DOCUMENTS

| | | | |
|---|---|---|---|
| 6,615,206 | B1 | 9/2003 | Jakobsson et al. |
| 8,732,159 | B2 | 5/2014 | Valentin |
| 9,122,724 | B2 | 9/2015 | Graefe |
| 2002/0091677 | A1* | 7/2002 | Sridhar ................ G06F 16/972 |
| 2007/0073759 | A1 | 3/2007 | El-Sabbagh |
| 2011/0138123 | A1* | 6/2011 | Gurajada .......... G06F 17/30595 |
| | | | 711/118 |
| 2011/0252000 | A1* | 10/2011 | Diaconu ........... G06F 17/30501 |
| | | | 707/638 |
| 2012/0210051 | A1* | 8/2012 | Colligan ................ G11B 15/18 |
| | | | 711/103 |
| 2013/0290282 | A1* | 10/2013 | Faerber ............ G06F 17/30153 |
| | | | 707/693 |
| 2014/0280024 | A1* | 9/2014 | Baskett ............ G06F 17/30498 |
| | | | 707/714 |
| 2015/0019528 | A1* | 1/2015 | Vijayan ............... G06F 17/3048 |
| | | | 707/713 |
| 2015/0261805 | A1* | 9/2015 | Lee ................... G06F 17/30353 |
| | | | 707/703 |
| 2017/0147664 | A1* | 5/2017 | Bussler ................... G06F 16/22 |

OTHER PUBLICATIONS

Valduriez, Patrick, "Join Indices", In Journal of ACM Transactions on Database Systems, vol. 12, No. 2, Jun. 1987, pp. 218-246.

Appleby, John, "Update IV: The SAP Hana FAQ—answering key SAP In-Memory questions", Published on: Sep. 10, 2014 Available at: http://www.bluefinsolutions.com/blogs/john-appleby/may-2012/update-iii-the-sap-hana-faq-answering-key-sap.

Larson, et al., "Evolving the Architecture of SQL Server for Modern Hardware Trends", In Proceedings of the IEEE 31st International Conference on Data Engineering, Apr. 13, 2015, pp. 1239-1245.

Larson, et al., "High-Performance Concurrency Control Mechanisms for Main-Memory Databases", In Proceedings of Very Large Data Bases Endowment, vol. 5, Issue 4, Dec. 2011, pp. 298-309.

Lehman, et al., "Query Processing in Main Memory Database Management Systems", In Proceedings of ACM Association for Computing Machinery's Special Interest Group on Management of Data International Conference on Management of Data, May 28, 1986, pp. 239-250.

"International Search Report and Written Opinion Issued in PCT Application No. PCT/US2017/052600", dated Nov. 8, 2017, 13 Pages.

Rastogi, et al., "Logical and Physical Versioning in Main Memory Databases", In Proceedings of the 23rd International Conference on Very Large Data Bases, Aug. 25, 1997, pp. 86-95.

Wang, Mengzhi, "Main Memory Databases—Advanced Topics in Database Systems Performance", Retrieved from «http://www.cs.cmu.edu/~natassa/courses/15-823/S01/lectures/18_mmdb.pdf», Apr. 5, 2001, 8 Pages.

* cited by examiner

DIRECT TABLE ASSOCIATION 44

FIRST TABLE 40

| ID | c1 | c2 | c3 |
|---|---|---|---|
| 1 |  |  |  |
| 2 |  |  | 4 |
| 3 |  |  |  |
| 4 |  |  |  |
| 5 |  |  | 4 |
| 6 |  |  | 7 |
| 7 |  |  |  |
| 8 |  |  | 4 |
| 9 |  |  | 7 |

46, 76

64

48, 78

SECOND TABLE 42

| ID | c1 | c2 | c3 |
|---|---|---|---|
| 1 |  |  |  |
| 2 |  |  |  |
| 3 |  |  |  |
| 4 |  |  |  |
| 5 |  |  |  |
| 6 |  |  |  |
| 7 |  |  |  |
| 8 |  |  |  |
| 9 |  |  |  |

PK VERSION ELEMENT 74

FIG. 4A

DIRECT TABLE ASSOCIATION 44

FIRST TABLE 40

| ID | Size | Color | Code |
|---|---|---|---|
| 1 | S | Black | 001231 |
| 2 | S | Grey | 001231 |
| 3 | S | White | 001231 |
| 4 | S | Black | 001232 |
| 5 | S | Grey | 001232 |
| 6 | S | White | 001232 |

46, 76

64

48, 78

SECOND TABLE 42

| ID | Code | Name |
|---|---|---|
| 1 | 001231 | Sleeveless, R |
| 2 | 001232 | Sleeveless, V |
| 3 | 001233 | Short sleeve, R |
| 4 | 001234 | Short sleeve, V |
| 5 | 001235 | Long sleeve, R |
| 6 | 001236 | Long sleeve, V |

PK VERSION ELEMENT 74

FIG. 4B

DIRECT TABLE ASSOCIATION IN IN-MEMORY DATABASES

BACKGROUND

Computerized databases are widely used to store and organize data. One area of recent application of computerized databases is processing of online transactions in real time. Typically, relational databases are used to handle such transactions. To serve the continually growing demand for online transactions, database developers face a challenge in developing such relational database systems that achieve low latency and can perform well in high concurrency conditions.

SUMMARY

To address the issues discussed above, a computerized database management system comprising a database server, a processor, and associated random access memory is provided. The processor may configure an in-memory database in the random access memory to have tables, each containing a plurality of cells with associated memory addresses, establish a direct table association between a row containing an origin cell and a row containing at least one target cell within the tables, receive a request to perform a join database operation of a first table including the origin cell on a second table including the target cell, dereference the direct table association for the origin cell to obtain a value the target cell stored at the memory address for the target cell, execute the join database operation to produce a joined table including the value, and store the joined table at a new location in the random access memory.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIGS. 4A-B are schematic views of a direct table association of the system of FIG. 1, showing a primary key version element.

DETAILED DESCRIPTION

The inventors of the subject application have discovered that processing queries to relational databases consumes significant processing resources, which in some use case scenarios, such as high concurrency, can result in unacceptable latency. Traditional database architectures that store table data in an on-disk location such as in solid state drives (SSDs) and hard disk drives (HDDs) only allow access to large blocks of data, which can take significant time to retrieve. The inventors have conceived of using in-memory database platforms, which offer faster access times than solid state drives and hard disk drives. By storing database data in random access memory rather than SSDs or HDDs, each byte of stored data can be accessed with low latency as compared to SSD or HDD storage. The increasing complexity of relational databases used in fields such as online transaction processing, as well as the increasing concurrency of the query load placed on such databases during peak usage times, has placed strain on current database architectures, which degrades latency performance.

Figure 1:
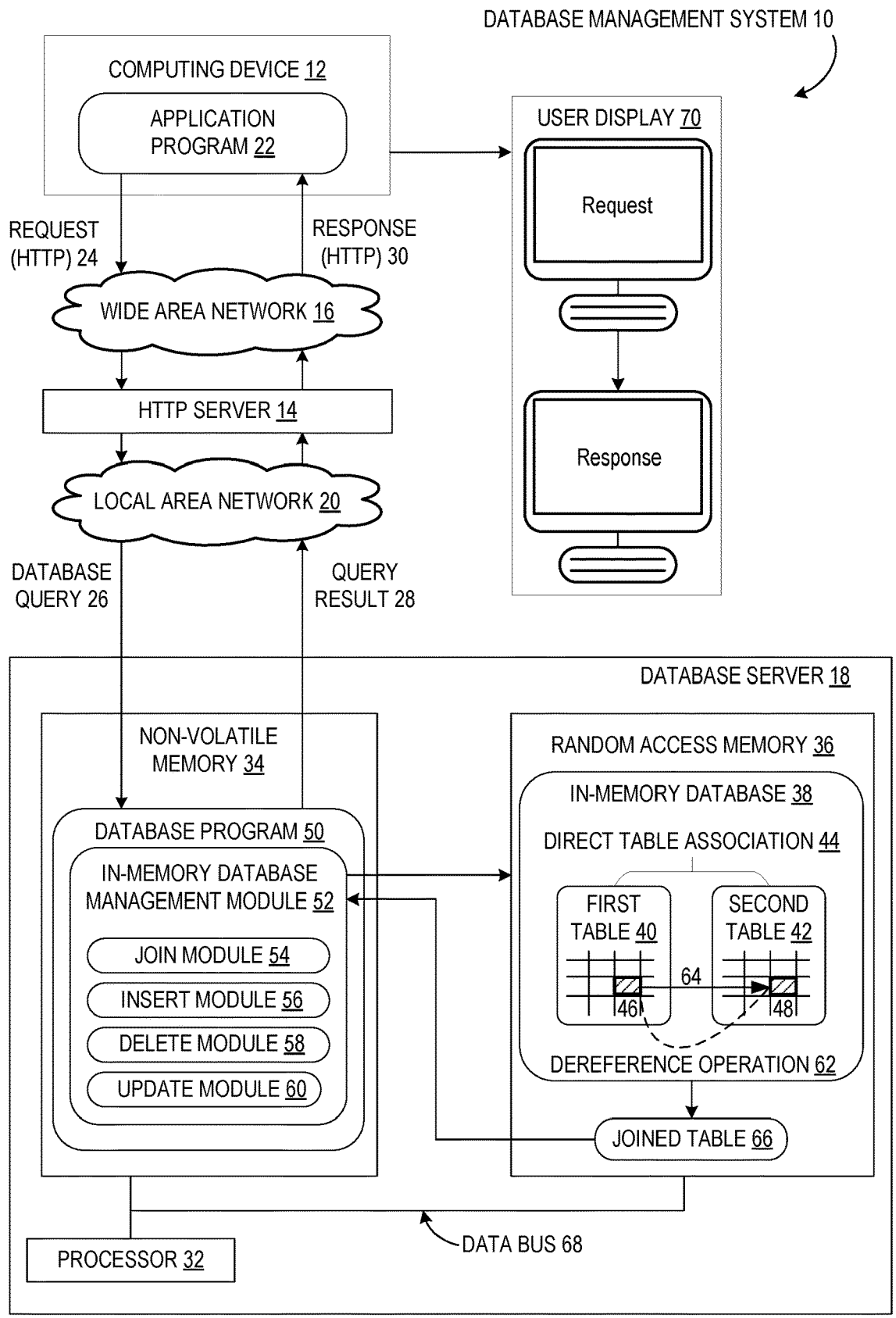
FIG. 1 is a schematic view of a computerized database management system, according to one embodiment of the present disclosure.

As shown FIG. 1, to address the above identified issues a computerized database management system 10 is provided. The computerized database management system 10 includes a computing device 12 configured to communicate with an HTTP server 14 via a wide area network (WAN) 16, such as the Internet. In turn, the HTTP server 14 is configured to communicate with a database server 18 via a local area network (LAN) 20. Alternatively, it will be appreciated that in some configurations the HTTP server 14 and database server 18 may communicate across a WAN. Additionally, the application program 22 on the computing device 12 may connect directly to the database program 50.

In an example of an online shopping transaction, a user may use an application program 22 executed by the computing device 12, to shop for a particular product. In an exemplary shopping session, the application program 22 downloads and displays a website, with a search interface that enables the user to conduct searches for information about a product, such as size, price, or available colors. The search queries are sent as HTTP requests 24 from the application program 22 to the HTTP server 14. In turn, to process the HTTP request 24, the HTTP server 14 sends a database query 26 to the back end database server 18, via local area network 20. The database server 18 processes the database query 26 and sends a query result 28 to the HTTP server 14, which processes the query result 28 and returns an HTTP response 30 to the user, which is displayed on the computing device 12.

The database server 18 includes a processor 32, non-volatile memory 34, and random access memory 36. Within an in-memory database 38 in the random access memory 36, the processor 32 is configured to include a first table 40 of a plurality of cells organized into logical rows and logical columns and a second table 42 of a plurality of cells organized into logical rows and logical columns, each of the cells having an associated memory address within the random access memory 36. The processor 32 is further configured to establish a direct table association 44 between a memory address of an origin cell 46 of the plurality of cells in the first table 40 and a memory address of a target cell 48 of the plurality of cells in the second table 42. It will be appreciated that the origin cell 46 may be a foreign key, and the target cell 48 may be a primary key (or another identifier) that has unique constraint such that a column containing the primary key does not have any duplicate values.

The non-volatile memory 34 in the database server 18 is configured to include a database program 50 that executes an in-memory database management module 52. The in-memory database management module 52 further includes various functional software modules programmed to perform specific functions relating to in-memory database management, including a join module 54, an insert module 56, a delete module 58, and an update module 60. It will be appreciated that the functionality of one or more of these software modules may be implemented in dedicated hardware such as an application specific integrated circuit (ASIC) or firmware, for example.

When the application program 22 executed by the computing device 12 sends an HTTP request 24, the HTTP server 14 processes the request according to application logic on the HTTP server 14. The application logic may generate a database query 26 that is sent to the database server 18. Returning to the example of an online shopping transaction, the HTTP request 24 may be to add a product to a shopping cart, and the shopping cart application may be executed by the HTTP server 14. The shopping cart application in turn may communicate with the back end database server 18 to verify that the desired product is in inventory, decrement inventory, obtain related pricing, discounts, and tax information, etc. During these communications, various database queries are sent between the HTTP server 14 and the database server 18. Thus, for example, if the HTTP request 24 is to add a product having a specific size and color to a shopping cart, the HTTP server 14 may send and database server 18 may receive a database query 26 to perform a join database operation of the first table 40 on the second table 42 to verify that the desired color of a product is available in the desired size. The join module 54 stored in the non-volatile memory 34 and executed by the processor 32 contains the program logic to implement the join database operation, according to the process described below.

The subject disclosure presents a new strategy for efficiently performing join database operations in a relational database that is an efficient alternative to current approaches that commonly include recurrent scan procedures. In a conventional system, to retrieve data from each table in a join operation, the conventional system traverses every row of a table or index to find a row containing the desired data. A scan is performed each time a join database operation is executed, regardless of previous joins on the same data sets. Because the efficiency of conventional join operations depends greatly upon the speed of scanning, latency is an ongoing concern for join operation performance. In contrast, according to the techniques described herein, only an initial scan of the second table 42 is utilized to create the direct table association 44, rather than scanning an entire table for each join operation. In subsequent join database operations after an initial scan, the direct table association 44 for the origin cell 46 in the first table 40 is dereferenced in a dereference operation 62 to obtain a value of the target cell 48 stored at the memory address for the target cell 48 in the second table 42. The configuration and provisioning of the direct table associations 44 and their use is described in detail below.

In one particular embodiment, the direct table association 44 includes a physical memory address pointer 64 between the data sets. It will be appreciated that a physical memory address pointer is a memory address pointer associated with at least one physical memory address stored on physical hardware. These pointers 64 are added to the first table 40 during the initial scan and enable subsequent join database operations to traverse the direct table association 44 to the second table 42 to find desired data in a row containing the target cell 48. The established direct table association 44 decreases latency, thereby improving the online transaction experience in view of current conventional systems. It will be appreciated that join operations are ubiquitous in online transaction processing, and thus when latency of an online transaction is exacerbated due to inefficient scanning during a join database operation, a user may not be motivated to complete the online transaction and may abandon their shopping cart. Accordingly, in one non-limiting example of the subject embodiments' potential utility, the techniques described may decrease latency, thereby improving user satisfaction, increasing the conversion rate of the online transactions, and generally improve the economic performance of an online shopping website.

For example, the processor 32 may receive a request to perform a join database operation of one or more rows or columns of the first table 40 including the origin cell 46 on one or more rows or columns of the second table 42 including the target cell 48. The direct table association 44 is dereferenced to obtain a value of the target cell 48, and the join database operation is executed using the value to produce a joined table 66 including the value stored at a new location in the random access memory 36. A data bus 68 transports the resulting data to the non-volatile memory 34 where it is sent as a query result 28 to the HTTP server 14 and translated to an HTTP response 30 to the application program 22 within the computing device 12 that issued the original HTTP request 24. Alternatively, the query result 28 may be transmitted directly to the application program 22 from the random access memory 36. The user may view the request and response by way of a user display 70, which may be formed separately as illustrated, or may be formed integrally with computing device 12.

Figure 2A:
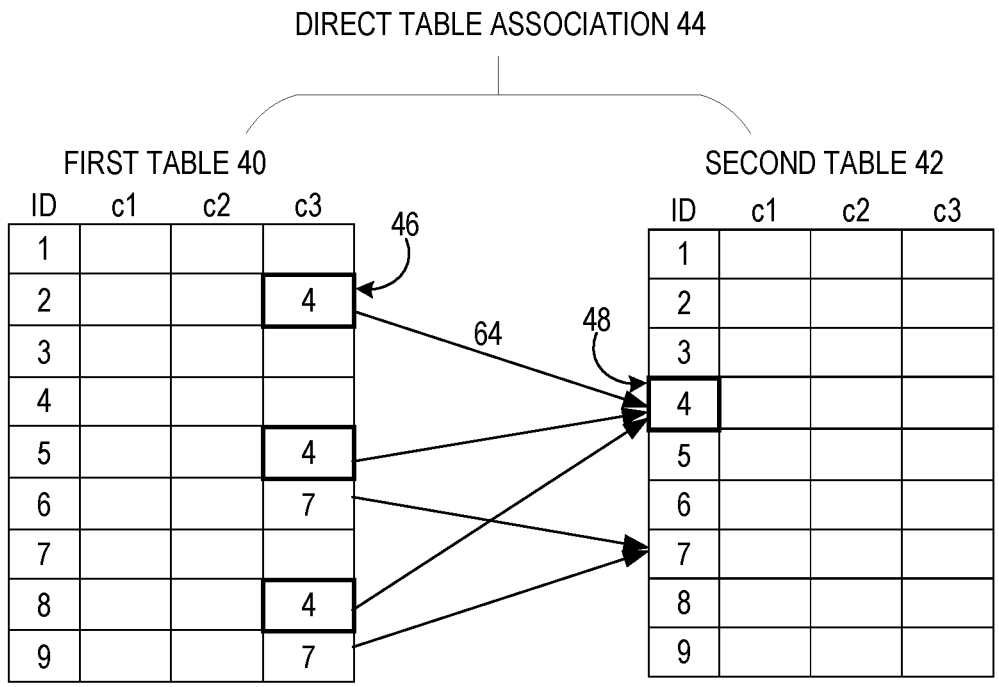
FIGS. 2A-B are schematic views of a direct table association of the system of FIG. 1, showing a many-to-one relationship.
Figure 2B:
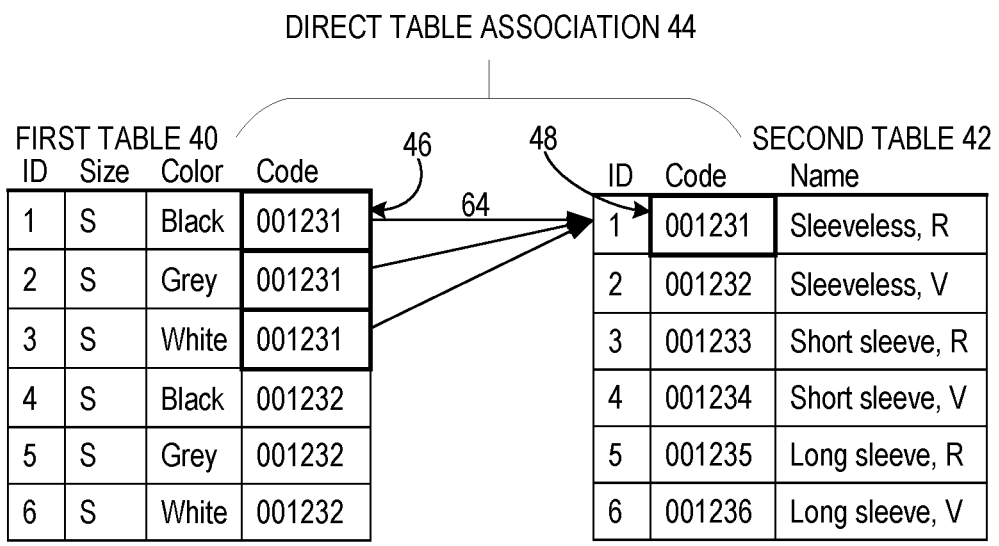

Turning now to FIG. 2A, an example of a join database operation on a many-to-one relationship between the first table 40 and the second table 42 is shown. The direct table association 44 between the first table 40 and the second table 42 includes a physical memory address pointer 64 within the row containing the origin cell 46 the first table 40 that points to the memory address of the target cell 48 in the second table 42. Turning now to FIG. 2B and continuing with the example of an online shopping transaction, the user may want to know how many colors of a product are available in a specific size. Specifically, the user may be looking for a sleeveless round-neck shirt in size small. In the depicted example, a join database operation is executed on a many-to-one relationship between the first and second tables 40, 42 in the database server using a physical memory address pointer 64 within the row containing the origin cell 46 in the first table 40 to join on the row containing the target cell 48 in the second table 42. In this example, the Code column in the first table 40 contains the foreign key, the ID column in the second table 42 is the primary key, and the join is performed on the Code column in the second table 42 that contains unique values. This direct table association 44 maintains a physical memory address pointer 64 from a row in the first table 40 to a referenced row in the second table 42, thereby greatly increasing the efficiency of accessing rows in the second table 42 over the conventional method of scanning a table for the requested data.

Figure 3A:
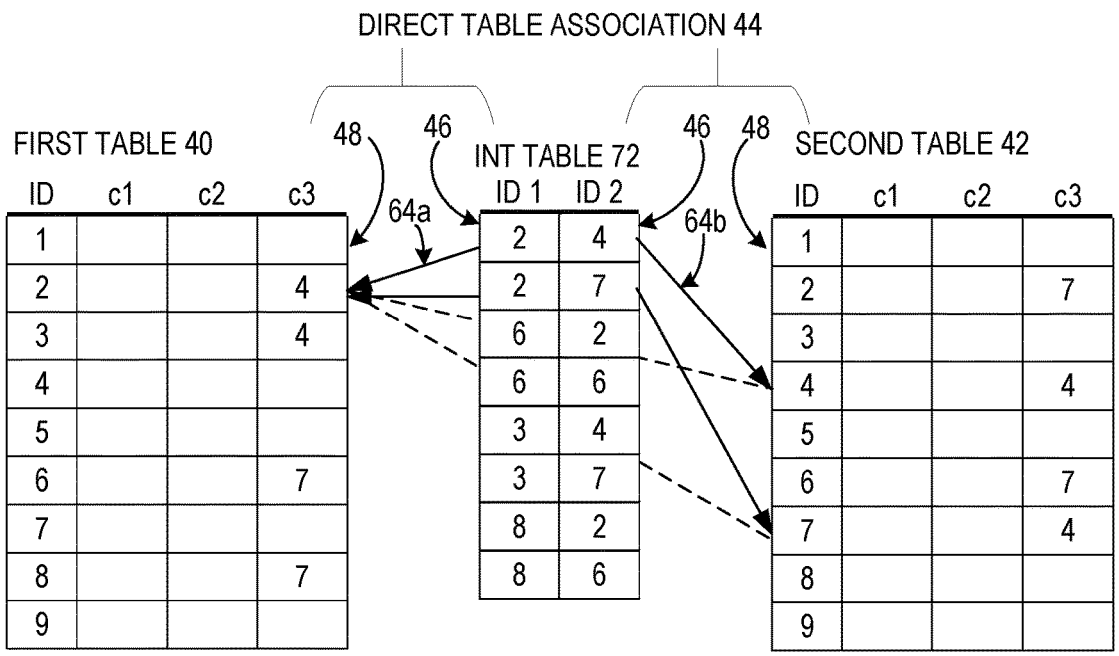
FIGS. 3A-B are schematic views of a direct table association of the system of FIG. 1, showing a many-to-many relationship with an intermediate index table.
Figure 3B:
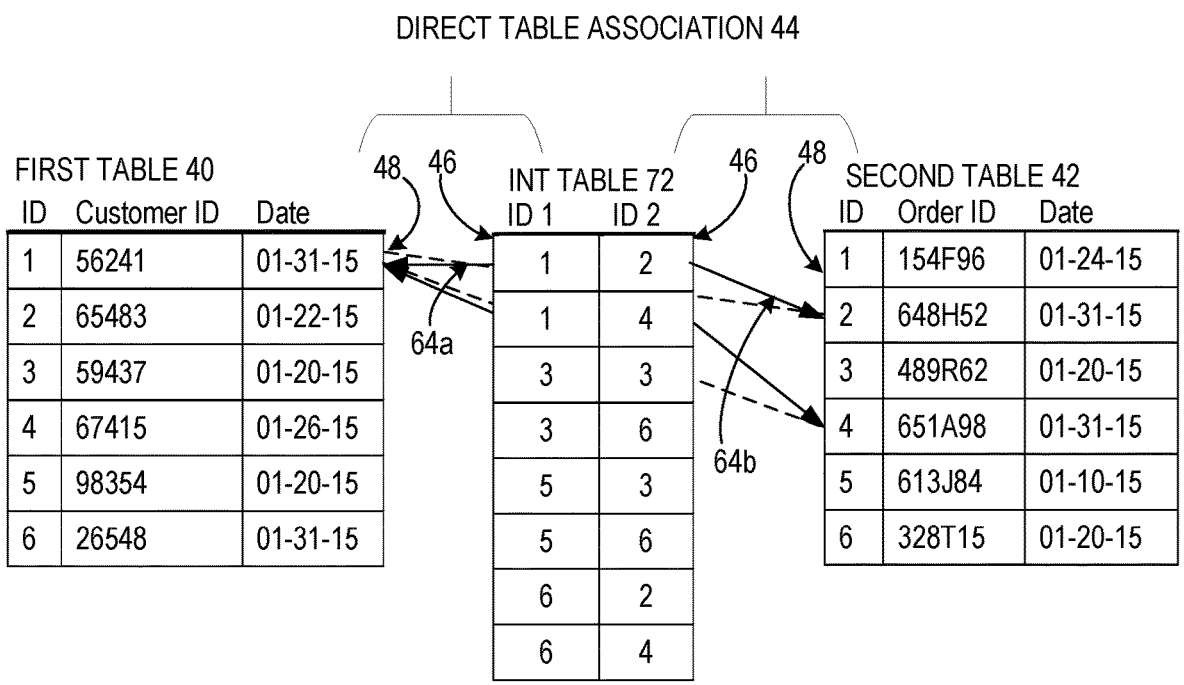

In FIG. 3A, an example of a join database operation on a many-to-many relationship between the first table 40 and the second table 42 is shown. Here, the optimization of the many-to-one relationship discussed above is applied to a many-to-many relationship. An intermediate table 72, which is comprised of a plurality of cells organized into logical rows and logical columns, transforms the many-to-many relationship into two many-to-one relationships. A first physical memory address pointer 64a forms a direct table association 44 between the first table 40 and the intermediate table 72, and a second physical memory address pointer 64b forms a direct table association between the second table 42 and the intermediate table 72. Through the direct table associations 44 with the intermediate table 72, the first table 40 and second table 42 can be efficiently joined with two pointer hops, as indicated by the dashed lines. It will be appreciated that exemplary pointers are included in the illustration, and not every pointer is shown. Turning now to FIG. 3B and continuing with the example of an online shopping transaction, a merchant user may desire to correlate customers with their orders based on order dates. Rather than scanning the entire second table 42 to retrieve the desired data, the same result may be achieved with an intermediate table and two pointer hops. In this case, the ID column in each of the first or second table 40, 42 identifies the rows containing the target cells 48, i.e., primary key, the intermediate table 72 is comprised of origin cells, i.e., foreign keys, and the join is performed on the Date column. The first physical memory address pointer 64a is included within at least one origin cell 46 of the plurality of cells of the intermediate table 72 and points to a memory address within random access memory 36 that corresponds to a target cell 48 of the plurality of cells in the first table 40, such as a product number. The second physical memory address pointer 64b is included within at least one origin cell 46 of the plurality of cells of the intermediate table 72 and points to a memory address within random access memory 36 that corresponds to at least one target cell 48 of the plurality of cells of the second table 42, such as a product number. Thus, a database query 26 for information contained within both the first and second tables 40, 42 in the database server 18 results in a join database operation between the first and second tables 40, 42. The intermediate table 72, comprising origin cells 46 with physical memory address pointers 64 to target cells 48 in the first and second tables 40, 42, serves to transform the many-to-many relationship to two many-to-one relationships that can be traversed with two pointer hops, as indicated by the dashed lines. It will be appreciated that exemplary pointers are included in the illustration, and not every pointer is shown.

Figure 5:
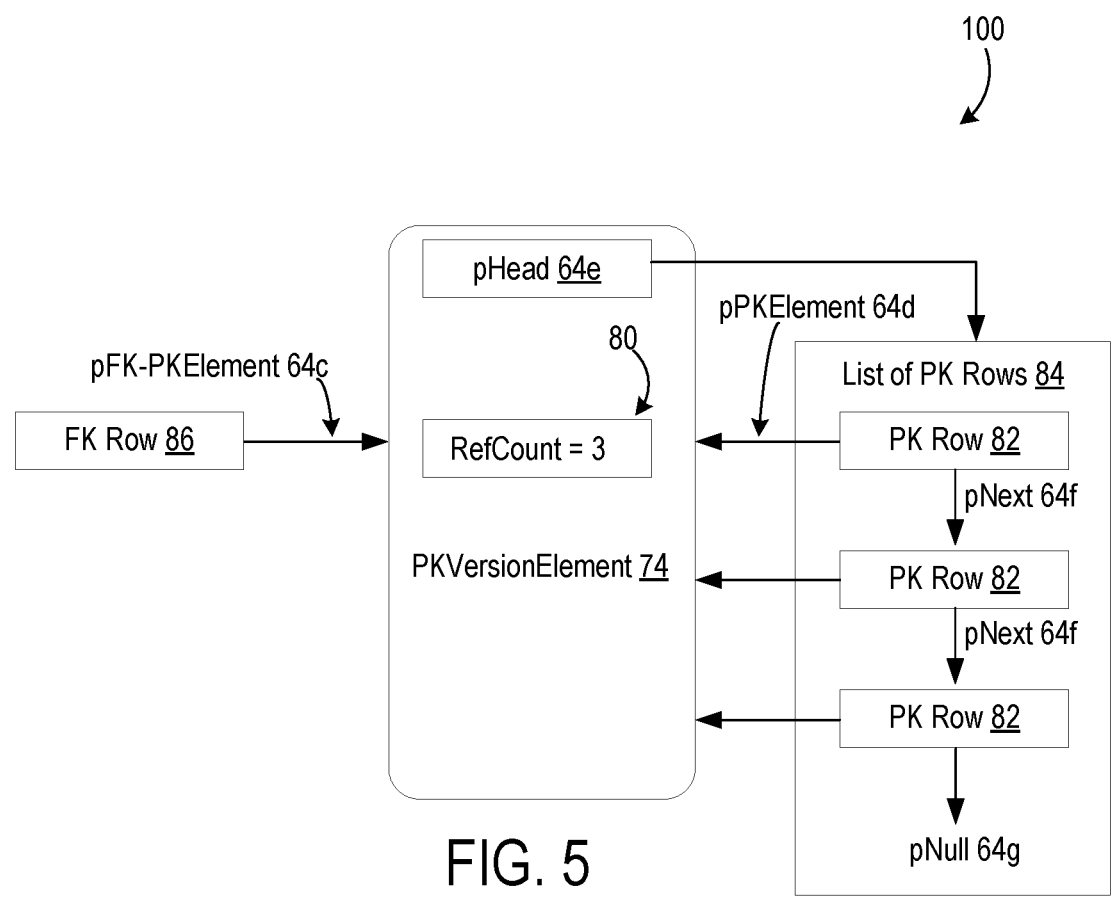
FIG. 5 is a schematic view of a join database operation in the system of FIG. 4.

Turning now to FIG. 4A, an example of a version element is shown. When changes occur in a multiuser database, it is desirable to record and manage these changes to present a consistent view of the database without creating a copy of the data. In this configuration, new data does not overwrite old data; instead, old data is marked as stale, and the new version of the data is added. Typically, each version of the data is labeled with a timestamp. Read transactions use the timestamp to identify which version of the data to read, and write transactions create a newer version. In this way, read and write functions may occur simultaneously. Versioning allows for the synchronization of data sets in multiuser situations, such as concurrent online shopping transactions. A primary key version element 74 maintains the direct table association 44 of data tables by updating associated physical memory address pointers 64 with each new version. Additionally, each version in the list can be identified by a time stamp. In this configuration, the row or column containing the origin cell 46 in the first table 40 contains a foreign key 76, and the row or column containing the target cell 48 in the second table contains primary key 78. The processor 32 defines a primary key version element 74 that is configured to include a physical memory address pointer 64 directed to the beginning of a list of primary key row versions, as well as a reference count 80 (as illustrated in FIG. 5). A row of the plurality of rows in the first table 40 that contains the origin cell 46 is configured to include a physical memory address pointer 64 directed to the primary key version element 74, and a row of the plurality of rows in the second table 42 that contains the target cell 48 is configured to include a physical memory address pointer 64 directed to the primary key version element 74. A reference count 80 is maintained to determine how many rows from the second table are referencing the primary key version element 74 at a point in time. Each primary key row has an associated pointer to the location in memory where the corresponding version is stored. Thus, the primary key version element 74 will be traversed until the appropriate (e.g., valid based on timestamp) primary key row version is found, and then a physical memory address pointer 64 corresponding to the appropriate primary key version will be selected.

FIG. 4B provides an example of a version element that maintains a direct table association 44 between primary and foreign key rows 78, 76 during an online shopping transaction. Versioning is particularly advantageous in such situations because they allows multiple concurrent users to efficiently utilize the same database while providing current (relative to the transaction) and accurate versions of data, such as merchandise inventory.

In FIG. 5, an example of a join database operation 100 is shown. A reference count 80 determines how many primary key rows 82 are referencing the primary key version element 74 at a point in time. A physical memory address pointer, pFK-PKElement 64c, is included in a foreign key row 86 and is directed to the primary key version element 74. Additional physical memory address pointers, pPKElement 64d, are included in each primary key row 82 in a list of primary key row versions 84 and are each directed to the primary key version element 74. Physical memory address pointer pHead 64e is included in the primary key version element 74 and is directed to a list of primary key row versions 84. Physical memory address pointers pNext 64f are included in each primary key row 82 and point to a subsequent row in the list of primary key row versions 84, and the last primary key row 82 in the list includes physical memory address pointer pNull 64g, which is the tail of the list of primary key row versions 84. When a database query 26 is received, the join module 54 in the in-memory database management system module 52 in FIG. 1 executes a join database operation 100 on a foreign key row 86 containing the foreign key 76 in the first table 40, and the foreign key 76 references the physical memory address pointer 64c to the prima key version element 74 to obtain a value of the primary key 78 stored in a primary key row 82 in the list of primary key rows 84 in the second table 42.

Figure 6:
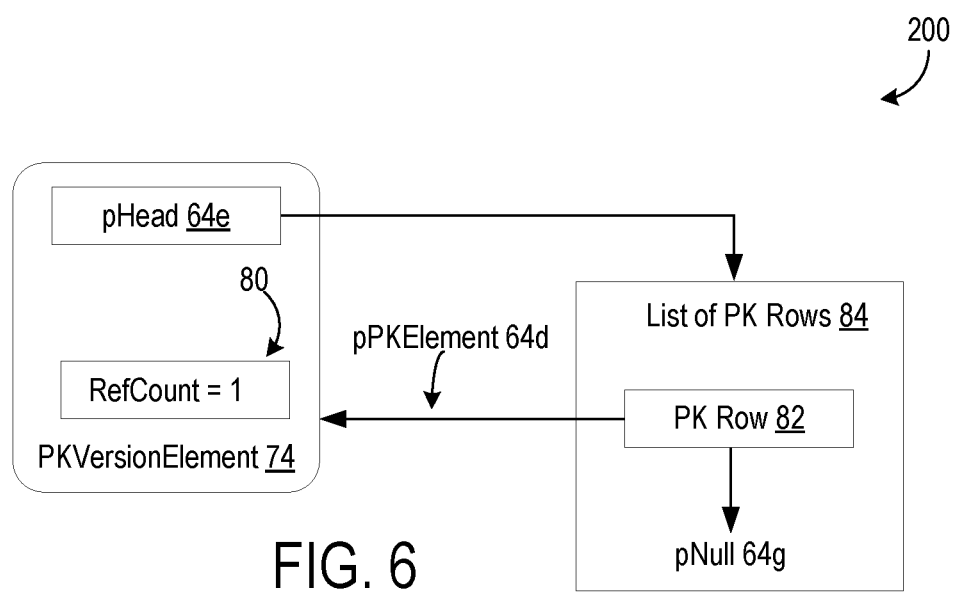
FIG. 6 is a schematic view of an insertion of a primary key row into a table and linking with the primary key version element in the system of FIG. 4.

In FIG. 6, an example of a primary key insertion operation 200 on a primary key element 74 is shown. When there is new data associated with the primary key 78, it may be desired to insert a primary row 82 into the second table 42.

In this case, the processor 32 receives a request to perform an insertion database operation to insert one or more primary key rows 82 into the second table 42. The insert module 56 in the in-memory database management system module 52 in FIG. 1 is executed, and the second table 42 is scanned to locate an appropriate location for the insert database operation. During the primary key insertion operation 200, random access memory 36 is allocated for a new primary key row 82, and a primary key version element 74 is allocated. The database operation is performed, including updating physical memory address pointers pPKElement 64*d* and pHead 64*e*. Pointer pPKElement 64*d* is included in the primary key row 82 and is directed to the primary key version element 74, and pHead 64*e* is included in the primary key version element 74 directed to the beginning of a list of primary key row versions 84, as shown in FIG. 6. A third physical memory address pointer, pNull 64*g*, is included in the primary key row 82 and is the tail of the list.

Figure 7:
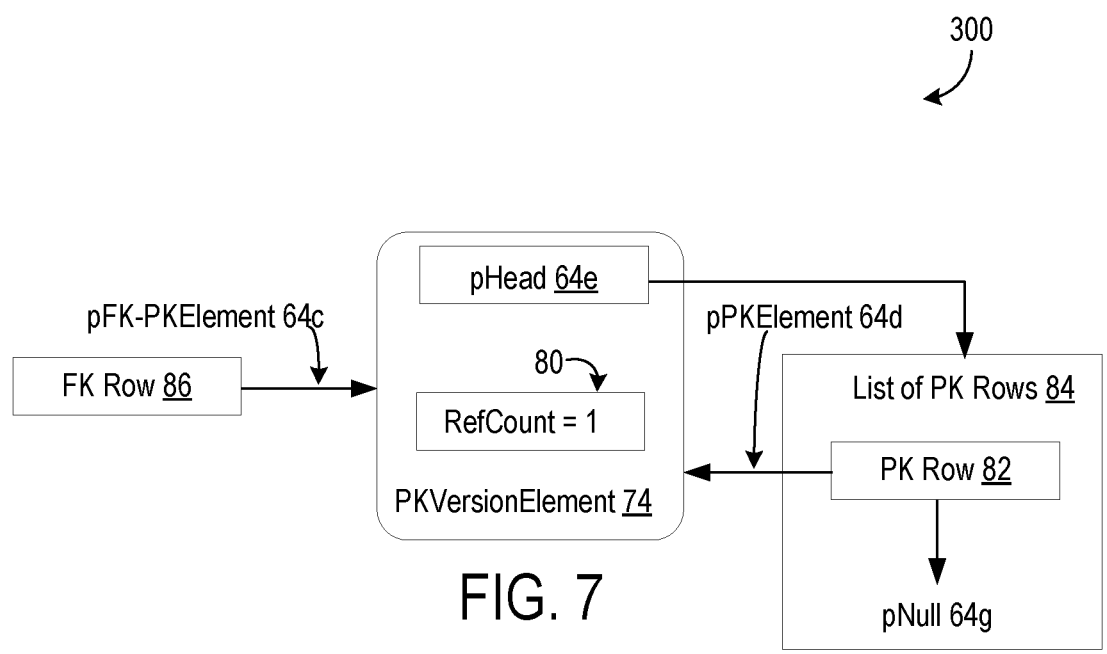
FIG. 7 is a schematic view of an insertion of a foreign key row into a table and linking with the primary key version element in the system of FIG. 4.

FIG. 7 provides an example of a foreign key insertion operation 300 on a primary key version element 74. When there is new data associated with the foreign key 76, it may be necessary to insert a foreign key row 86 into the first table 40. In this case, the processor 32 receives a request to perform a insertion database operation to insert one or more foreign key rows 86 into the first table 40. The insert module 56 in the in-memory database management system module 52 in FIG. 1 is executed, and the first table 40 is scanned to locate an appropriate location for the insertion database operation. During the foreign key insertion operation 300, random access memory 36 is allocated to support implementation of a physical memory address pointer 64. The database operation is performed, including the creation of the physical memory address pointer, pFK-PKElement 64*c*, which is directed to the primary key version element 74, as shown in FIG. 7. Insertion of the foreign key row 86 is validated by scanning the second table 42 for the corresponding primary key row 82, and a physical memory address pointer 64*d* from the corresponding primary key row 82 is referenced to initialize the foreign key row 86 to point to the primary key version element 74.

Figure 8:
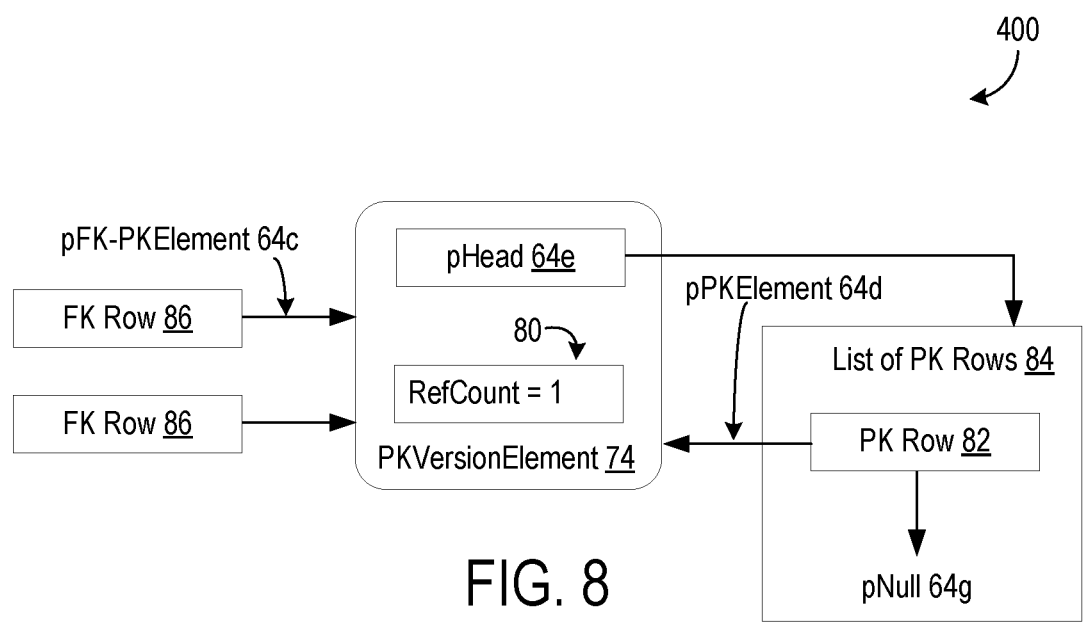
FIG. 8 is a schematic view of a deletion of a primary key row from a list of primary key rows of the primary key version element in the system of FIG. 4.

In FIG. 8, an example of a primary key deletion operation 400 from the second table on a primary key version element 74 is shown. Logical deletions are achieved by way of timestamps in that stale data can be identified by an outdated timestamp and is then excluded from subsequent join functions, yet it remains in the database since it can be valid for prior transactions. In the case of a logical deletion, the processor 32 receives a request to perform a deletion database operation to delete one or more rows of primary keys 82 in the second table 42. The delete module 58 in the in-memory database management system module 52 in FIG. 1 is executed, and the second table 42 is scanned to identify a primary key row or rows 82 that is subject for deletion. For each such primary key row or rows 82, the first table 40 is scanned to determine that no foreign key rows 86 are referencing the primary key row 82 that is subject to deletion. The primary key row 82 with an outdated timestamp is then marked as deleted. When an oldest transaction in the database management system is younger than a timestamp of the logically deleted primary key row 82, it may be desirable to physically delete the primary key row 82 to clean up memory. In this case, the deleted primary key row 82 is removed from the list of primary key rows 84, memory space associated with the deleted primary key row 82 is released, and the reference count 80 in the associated primary key version element 74 is decremented by one. When it is determined that reference count 80 of the primary key version element 74 associated with the deleted primary key row 82 is zero, the primary key version element 74 is deleted, and memory associated with the deleted primary key version element 74 is released.

Figure 9:
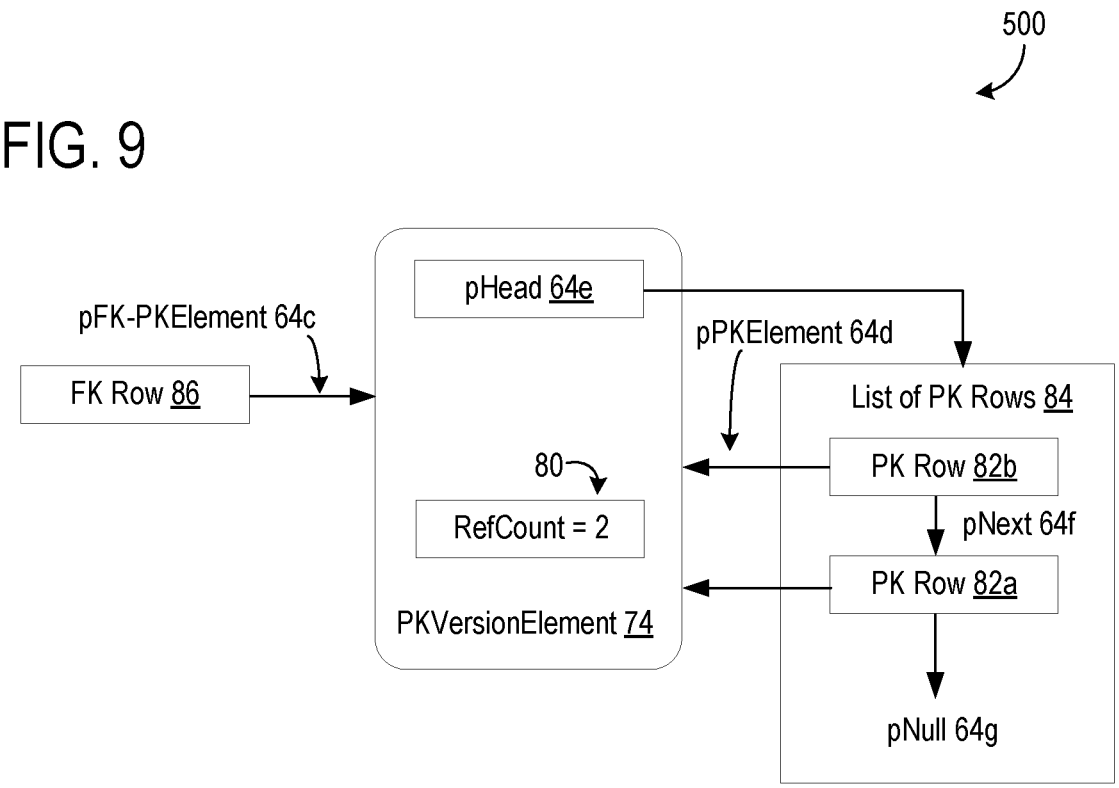
FIG. 9 is a schematic view of an update of a primary key row from the list of primary key rows of the primary key version element in the system of FIG. 4.

In FIG. 9, an example of a primary key update operation 500 on a primary key version element 74 is shown. When data associated with the primary key 78 is changed, it may be necessary to update a primary key row 82*a* to a new primary key row 82*b* in the second table 42 to maintain the current version of the data. In this case, the processor 32 receives a request to perform an update database operation to update one or more rows of primary keys 82*a* into the second table 42. The update module 60 in the in-memory database management system module 52 in FIG. 1 is executed, and the second table 42 is scanned to determine which primary key row or rows 82 is stale. When a primary key row 82*a* is updated to a new primary key row 82*b*, the new primary key row 82*b* is inserted into the list of primary key row versions 84, the physical memory address pointer, pPKElement 64*d*, included in the new primary key row 82*b* is updated to point to the primary key version element 74, the physical memory address pointer, pHead 64*e*, is included in the primary key version element 74 is updated to point to the new primary key row 82*b*, and the reference count 80 is incremented by one.

Figure 10:
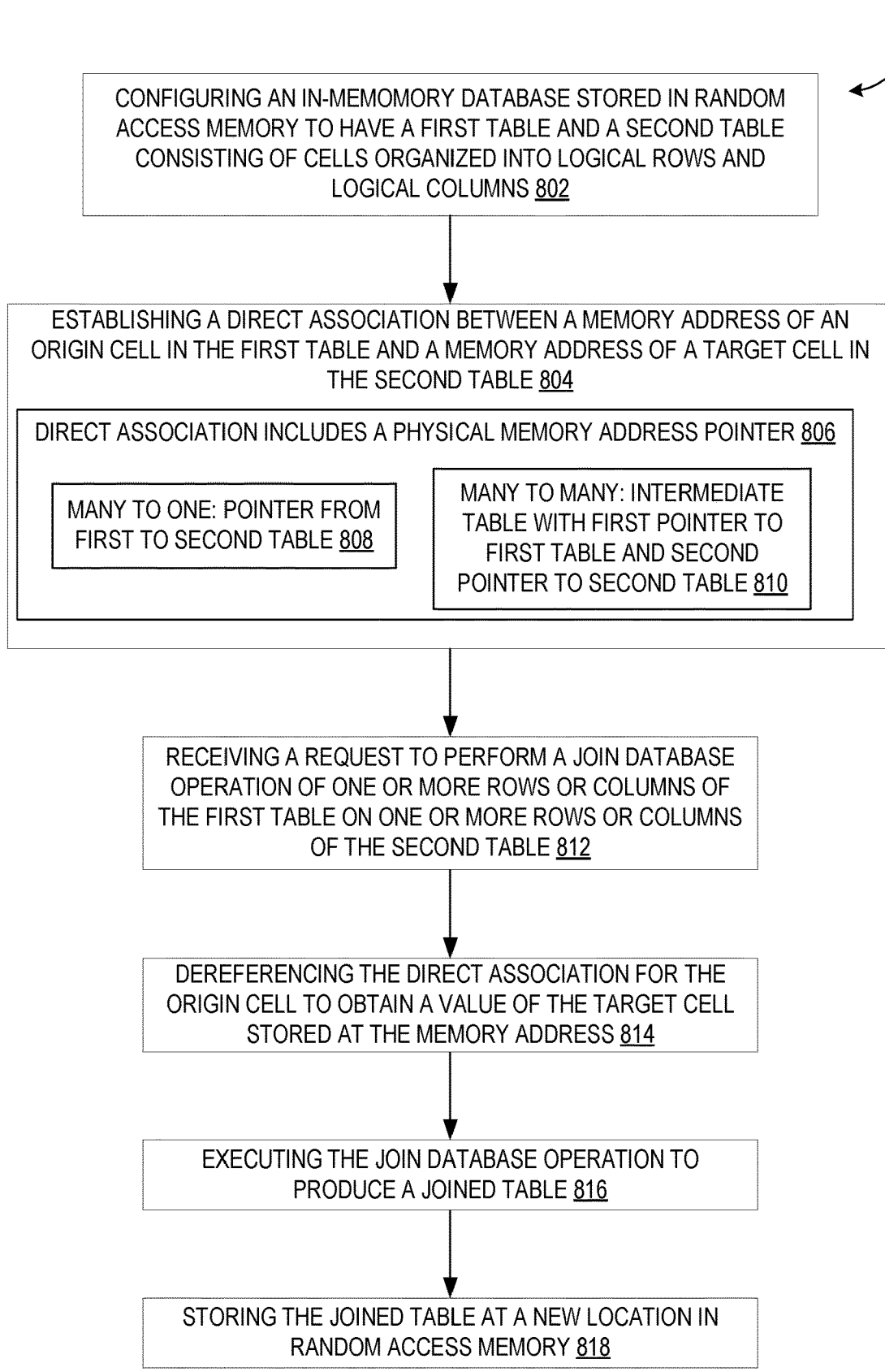
FIG. 10 is a flowchart of a method for computerized database management, according to one embodiment of the present disclosure.

FIG. 10 shows an example method 800 according to an embodiment of the present description. Method 800 may be implemented on the computer system 10 described above or on other suitable computer hardware. At step 802, the method 800 may include configuring an in-memory database stored in random access memory to have tables consisting of cells organized into logical rows and logical columns. As described above, each of the cells is configured to have an associated memory address within the random access memory.

Proceeding from step 802 to step 804, the method may include establishing a direct table association between a memory address of an origin cell and a memory address of a target cell. An initial scan of the second table containing the target cell is utilized to create the direct table association, which may include a direct physical memory address pointer between the data sets as shown in substep 806. These pointers are added to the tables during the initial scan and enable subsequent database operations to traverse the direct table association to the second table rather than require a full scan of the second table to find desired data. As illustrated at 808, the direct table association may include a pointer from a first table to a second table in the context of a many-to-one relationship. In another example, illustrated at 810, direct table association may be created for a many-to-many relationship and may include an intermediate table with a first physical memory address pointer to a first table and a second physical memory address pointer to a second table. The established direct table association decreases latency and improves online transaction experiences.

Advancing from step 804 to 812, the method may include receiving a request to perform a join database operation of one or more rows or columns of the first table on one or more rows or columns of the second table. In an example of an online shopping transaction, a user may issue a command on a computing device to make a purchase of an item of clothing from an online store. To process the user's request, it may be necessary to perform a join database operation of the first table on the second table to verify that the desired color of a product is available in the desired size. A join module stored in the non-volatile memory and executed by the processor contains the program logic to implement the join database operation.

Progressing from step 812 to step 814, the method may include dereferencing the direct table association for the origin cell to obtain a value of the target cell stored at the memory address. As discussed above, a dereference operation is executed on the physical memory address pointer between the first and second tables.

Continuing from step 814 to 816, the method may include executing the join database operation to produce a joined table. A join module within the in-memory database management module may be executed to join data from the row containing the origin cell in the first table on the row containing the target cell in the second table. A joined table is created, containing the desired data from the first and second tables. Returning to the example of an online shopping transaction, the joined table may include information about a product, i.e., an item of clothing, such as color, size, price, or inventory.

Advancing from step 816 to 818, the method may include storing the joined table in random access memory. Once stored, the data is available for the processor to send as a query result back to an HTTP server, allowing an end user to receive a response containing the requested information. It will be appreciated that the data may be sent in a streaming fashion to avoid latency. Continuing with the example of an online shopping transaction, the data contained in the joined table may be the sizes and colors of a desired item of clothing that would enable the user to complete their online shopping transaction.

It will be appreciated that the method steps described above may be performed using the algorithmic processes described throughout this disclosure, including in the description of the computing system 10 above.

In some embodiments, the methods and processes described herein may be tied to a computing system of one or more computing devices. In particular, such methods and processes may be implemented as a computer-application program or service, an application-programming interface (API), a library, and/or other computer-program product.

Figure 11:
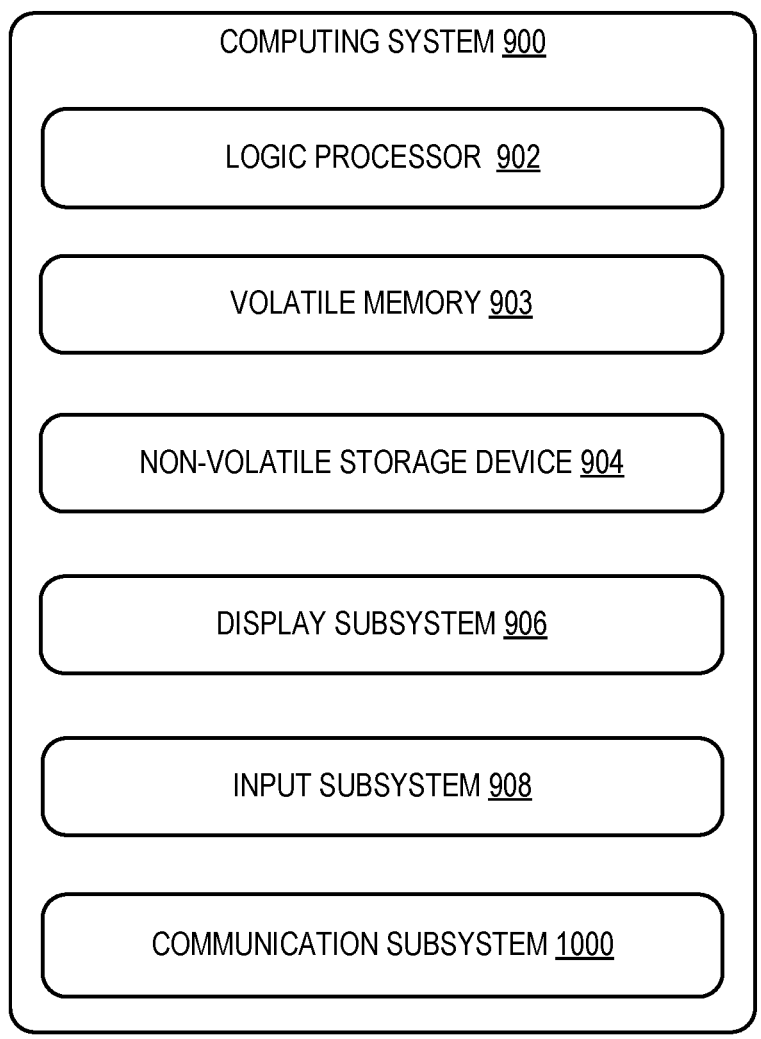
FIG. 11 shows an example computing system according to an embodiment of the present disclosure.

FIG. 11 schematically shows a non-limiting embodiment of a computing system 900 that can enact one or more of the methods and processes described above. Computing system 900 is shown in simplified form. Computing system 900 may embody the computing device 12 or database server 18 of system 10, for example. Computing system 900 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 900 includes a logic processor 902 volatile memory 903, and a non-volatile storage device 904. Computing system 900 may optionally include a display subsystem 906, input subsystem 908, communication subsystem 1000, and/or other components not shown in FIG. 11.

Logic processor 902 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 902 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 904 includes one or more physical devices configured to hold instructions executable by the logic processors to implement the methods and processes described herein. When such methods and processes are implemented, the state of non-volatile storage device 94 may be transformed—e.g., to hold different data.

Non-volatile storage device 904 may include physical devices that are removable and/or built-in. Non-volatile storage device 94 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 904 may include nonvolatile, dynamic, static, read/write, read-only, sequential-access, location-addressable, file-addressable, and/or content-addressable devices. It will be appreciated that non-volatile storage device 904 is configured to hold instructions even when power is cut to the non-volatile storage device 904.

Volatile memory 903 may include physical devices that include random access memory. It will be appreciated that random access memory may also be provided in non-volatile memory. Volatile memory 903 is typically utilized by logic processor 902 to temporarily store information during processing of software instructions. It will be appreciated that volatile memory 903 typically does not continue to store instructions when power is cut to the volatile memory 903.

Aspects of logic processor 902, volatile memory 903, and non-volatile storage device 904 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 900 typically implemented in software by a processor to perform a particular function using portions of volatile memory, which function involves transformative processing that specially configures the processor to perform the function. Thus, a module, program, or engine may be instantiated via logic processor 902 executing instructions held by non-volatile storage device 904, using portions of volatile memory 903. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 906 may be used to present a visual representation of data held by non-volatile storage device 904. The visual representation may take the form of a graphical user interface (GUI). As the herein described methods and processes change the data held by the non-volatile storage device, and thus transform the state of the non-volatile storage device, the state of display subsystem 906 may likewise be transformed to visually represent changes in the underlying data. Display subsystem 906 may include one or more display devices utilizing virtually any type of technology. Such display devices may be combined with logic processor 902, volatile memory 903, and/or non-volatile storage device 904 in a shared enclosure, or such display devices may be peripheral display devices.

When included, input subsystem 908 may comprise or interface with one or more user-input devices such as a keyboard, mouse, touch screen, microphone, camera, or game controller.

When included, communication subsystem 1000 may be configured to communicatively couple various computing devices described herein with each other, and with other devices. Communication subsystem 1000 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 900 to send and/or receive messages to and/or from other devices via a network such as the Internet.

The following paragraphs provide additional support for the claims of the subject application. One aspect provides a computerized database management system comprising a database server including a processor and associated random access memory. The processor may be configured to configure an in-memory database in the random access memory to have a first table of a plurality of cells organized into logical rows and logical columns and a second table of a plurality of cells organized into logical rows and logical columns, each of the cells of each of the tables having an associated memory address within the random access memory, establish a direct table association between a memory address of an origin cell of the plurality of cells of the first table and a memory address of a target cell of the plurality of cells of the second table, receive a request to perform a join database operation of one or more rows or columns of the first table including the origin cell on one or more rows or columns of the second table including the target cell, dereference the direct table association for the origin cell to obtain a value of the target cell stored at the memory address for the target cell, execute the join database operation using the value, to thereby produce a joined table including the value, and store the joined table at a new location in the random access memory. In this aspect, additionally or alternatively, the join database operation may be a join database operation on a many-to-one relationship between the first table and second table, and the direct table association may include a physical memory address pointer that may be included within a row containing the origin cell and which may point to the memory address of the target cell. In this aspect, additionally or alternatively, the join database operation may be a join database operation on a many-to-many relationship between the first table and the second table, and the direct table association may include an intermediate table, a first physical memory address pointer, and a second physical memory address pointer, wherein the intermediate table may comprise a plurality of cells organized into logical rows and logical columns, the first physical memory address pointer may be included within at least one cell of the plurality of cells of the intermediate table and may point to a memory address within random access memory corresponding to a target cell of the plurality of cells of the first table, and the second physical memory address pointer may be included within at least one cell of the plurality of cells of the intermediate table and may point to a memory address within random access memory corresponding to at least one target cell of the plurality of cells of the second table. In this aspect, additionally or alternatively, the row or column containing the origin cell may contain a foreign key and the row or column containing the target cell may contain a primary key, and the processor may be further configured to define a primary key version element which may be configured to include a physical memory address pointer directed to a beginning of a list of primary key row versions, wherein a row of the plurality of rows that contains the origin cell may be configured to include a physical memory address pointer directed to the primary key version element, a row of the plurality of rows that contains the target cell may be configured to include a physical memory address pointer directed to the primary key version element, and a reference count may determine how many primary rows are referencing the primary key version element at a point in time. In this aspect, additionally or alternatively, the processor may be further configured to execute the join database operation on the row containing the foreign key of the first table wherein the foreign key may reference the physical memory address pointer to the primary key version element to obtain the primary key value stored in the second table. In this aspect, additionally or alternatively, the processor may be further configured to receive a request to perform an insertion database operation to insert one or more rows of primary keys into the second table, scan the second table to locate an appropriate location for the insertion database operation, allocate random access memory for addition of a new primary key row, allocate a primary key version element, perform the insertion database operation, update a physical memory address pointer in the primary key version element directed to the list of primary key row versions, update a physical memory address pointer in the primary key row version directed to primary key version element, and include a physical memory address pointer in the primary key row version directed to the subsequent row the list of primary key row versions. In this aspect, additionally or alternatively, the processor may be further configured to receive a request to perform a database operation to insert one or more rows of foreign keys into the first table, scan the first table to locate an appropriate location for the insertion database operation, allocate memory for supporting physical memory address pointer implementation, perform the insertion database operation, create a physical memory address pointer in the foreign key row to be directed to the primary key version element, validate insertion of the foreign key row by scanning the second table for the corresponding primary key row version, and reference a physical memory address pointer from the corresponding primary key row version to initialize the foreign key row to point to the primary key version element. In this aspect, additionally or alternatively, the processor may be further configured to receive a request to perform a database operation to delete one or more primary key rows in the second table, scan the primary key rows to identify the primary key row that is subject for deletion, scan the foreign key rows the first table to determine that no foreign key rows are referencing the primary key row to be deleted, mark the primary key row as deleted, and when an oldest transaction in the computerized database management system is younger than a timestamp of the deleted primary key row, remove the deleted primary key row from the list of primary key rows, release memory space associated with the deleted primary key row, decrement the reference count in the primary key version element by one, determine that the reference count of the primary key version element associated with the deleted primary key row is zero, and in response to the determination, delete the primary key version element and release memory space associated with the deleted primary key version element. In this aspect, additionally or alternatively, the processor may be further configured to receive a request to perform a database operation to update one or more rows in the second table, scan the second table to determine which primary key row or rows is stale, insert the new primary key row into the list of primary key row versions, update the physical memory address pointer included in the new primary key row to point to the primary key version element, update the physical memory address pointer included in the primary key version element to point to the new primary key row, and increment the reference count by one. In this aspect, additionally or alternatively, the random access memory may be non-volatile random access memory.

Another aspect provides a method for a database server, a processor, and associated random access memory, comprising configuring an in-memory database in the random access memory to have a first table of a plurality of cells organized into logical rows and logical columns and a second table of a plurality of cells organized into logical rows and logical columns, each of the cells of each of the tables having an associated memory address within the random access memory, establishing a direct table association between a memory address of an origin cell of the plurality of cells of the first table and a memory address of a target cell of the plurality of cells of the second table, receiving a request to perform a join database operation of one or more rows or columns of the first table including the origin cell on one or more rows or columns of the second table including the target cell, dereferencing the direct table association for the origin cell to obtain a value of the target cell stored at the memory address for the target cell, executing the join database operation using the value, to thereby produce a joined table including the value, and storing the joined table at a new location in the random access memory. In this aspect, additionally or alternatively, the join database operation may be a join database operation on a many-to-one relationship between the first table and second table, and the direct table association may include a physical memory address pointer that may be included within the origin cell and which may point to the memory address of the target cell. In this aspect, additionally or alternatively, the join database operation may be a join database operation on a many-to-many relationship between the first table and the second table, and the direct table association may include an intermediate table, a first physical memory address pointer, and a second physical memory address pointer, wherein the intermediate table may consist of a plurality of cells organized into logical rows and logical columns, the first physical memory address pointer may be included within at least one cell of the plurality of cells of the intermediate table and may point to a memory address within random access memory corresponding to a target cell of the plurality of cells of the first table, and the second physical memory address pointer may be included within at least one cell of the plurality of cells of the intermediate table and may point to a memory address within random access memory corresponding to at least one target of the plurality of cells of the second table. In this aspect, additionally or alternatively, the row or column containing the origin cell may contain a foreign key and the row or column containing the target cell may contain a primary key, and the method may further comprise defining a primary key version element which may be configured to include a physical memory address pointer directed to a beginning of a list of primary key row versions, wherein a row of the plurality of rows that contains the target cell may be configure to include a physical memory address pointer directed to the primary key version element, and a row of the plurality rows that contains the origin cell may be configured to include a physical memory address pointer directed to the primary key version element, maintaining a reference count to determine how many rows are referencing the primary key version element at a point in time, and executing a join operation on the column containing the foreign key of the first table wherein the foreign key may reference the physical memory address pointer to the primary key version element to obtain the primary key value stored in the second table. In this aspect, additionally or alternatively, the method may further comprise receiving a request to perform an insertion database operation to insert one or more rows of primary keys into the second table, scanning the second table to locate an appropriate location for the insertion database operation, allocating random access memory for addition of a new primary key row, allocating a primary version element, performing the insertion database operation, updating a physical memory address pointer in the primary key version element directed to the list of primary key row versions, updating a physical memory address pointer in the primary key row version directed to primary key version element, and including a physical memory address pointer in the primary key row version directed to the subsequent row in the list of primary key row versions. In this aspect, additionally or alternatively, the method may further comprise receiving a request to perform a database operation to insert one or more rows of foreign keys into the first table, scanning the first table to locate an appropriate location for the insertion database operation, allocating memory for supporting physical memory address pointer implementation, performing the insertion database operation, creating a physical memory address pointer in the foreign key row directed to the primary key version element, validating insertion of the foreign key row by scanning the second table for the corresponding primary key row version, and referencing a physical memory address pointer from the corresponding primary key row version to initialize the foreign key row to point to the primary key version element. In this aspect, additionally or alternatively, the method may further comprise receiving a request to perform a database operation to delete one or more primary key rows in the second table, scanning the primary key rows to identify the primary key row that is subject for deletion, scanning the foreign key the first table to determine that no foreign key rows are referencing the primary key row to be deleted, marking the primary key row as deleted, and when an oldest transaction in the computerized database management system is younger than a timestamp of the deleted primary key row, removing the deleted primary key row from the list of primary key rows, releasing memory space associated with the deleted primary key row, and decrementing the reference count in the primary key version element by one, determining that the reference count of the primary key version element associated with the deleted primary key row is zero, and in response to the determination, deleting the primary key version element and releasing memory space associated with the deleted primary key version element. In this aspect, additionally or alternatively, the method may further comprise receiving a request to perform a database operation to update one or more rows in the second table, scanning the second table to determine which primary key row or rows is stale, inserting the new primary key row into the list of primary key row versions, updating the physical memory address pointer included in the new primary key row to point to the primary version element, updating the physical memory address pointer included in the primary key version element to point to the new primary key row, and incrementing the reference count by one. In this aspect, additionally or alternatively, the random access memory may be non-volatile random access memory.

Another aspect provides a computerized database management system comprising a database server including a processor and associated random access memory. The processor may be configured to configure an in-memory database in the random access memory to have a first table of a plurality of cells organized into logical rows and logical columns and a second table of a plurality of cells organized into logical rows and logical columns, each of the cells of each of the tables having an associated memory address within the random access memory, establish a direct table association between a memory address of an origin cell of the plurality of cells of the first table and a memory address of a target cell of the plurality of cells of the second table, wherein the direct table association includes a physical memory address pointer, and wherein the physical memory address pointer is a foreign key, receive a request to perform a database operation, dereference the direct table association for the origin cell to obtain a value of the target cell stored at the memory address for the target cell, execute the database operation using the value, to thereby produce a result table including the value, and store the result table at a new location in the random access memory.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computerized database management system, comprising:

a database server including a processor and associated random access memory, the processor being configured to:
configure an in-memory database in the random access memory to have a first table of a plurality of cells organized into logical rows and logical columns and a second table of a plurality of cells organized into logical rows and logical columns, each of the cells of each of the tables having an associated memory address within the random access memory;
perform an initial scan of the second table to establish a direct table association between a memory address of an origin cell of the plurality of cells of the first table and a memory address of a target cell of the plurality of cells of the second table, the direct table association including at least one physical memory address pointer associated with at least one physical memory address stored on physical hardware, the physical memory address pointer being added to the first table during the initial scan of the second table;
receive a request to perform a join database operation of one or more rows or columns of the first table including the origin cell on one or more rows or columns of the second table including the target cell, wherein the join database operation is a join database operation on a many-to-many relationship between the first table and the second table, the direct table association includes an intermediate table, a first physical memory address pointer, and a second physical memory address pointer, and the intermediate table comprises a plurality of cells organized into logical rows and logical columns;
dereference the direct table association for the origin cell to obtain a value of the target cell stored at the physical memory address for the target cell;
execute the join database operation using the value, to thereby produce a joined table including the value; and
store the joined table at a new location in the random access memory, wherein
subsequent join database operations of the first table on the second table are performed by dereferencing the direct table association that was established via the initial scan of the second table,
the first physical memory address pointer is included within at least one cell of the plurality of cells of the intermediate table and points to a physical memory address within random access memory corresponding to a target cell of the plurality of cells of the first table, and
the second physical memory address pointer is included within at least one cell of the plurality of cells of the intermediate table and points to a physical memory address within random access memory corresponding to at least one target cell of the plurality of cells of the second table.

2. The computerized database management system according to claim 1, wherein
the row or column containing the origin cell contains a foreign key and the row or column containing the target cell contains a primary key; and
the processor is further configured to define a primary key version element which is configured to include:
a physical memory address pointer directed to a beginning of a list of primary key row versions, wherein a row of the plurality of rows that contains the origin cell is configured to include a physical memory address pointer directed to the primary key version element, and a row of the plurality of rows that contains the target cell is configured to include a physical memory address pointer directed to the primary key version element; and a reference count to determine how many primary rows are referencing the primary key version element at a point in time.

3. The computerized database management system according to claim 2, where in the processor is further configured to:

execute the join database operation on the row containing the foreign key of the first table wherein the foreign key references the physical memory address pointer to the primary key version element, to obtain the primary key value stored in the second table.

4. The computerized database management system according to claim 2, wherein the processor is further configured to:

receive a request to perform an insertion database operation to insert one or more rows of primary keys into the second table;

scan the second table to locate an appropriate location for the insertion database operation;

allocate random access memory for addition of a new primary key row;

allocate a primary key version element;

perform the insertion database operation;

update the physical memory address pointer in the primary key version element directed to the list of primary key row versions;

update the physical memory address pointer in the primary key row version directed to primary key version element; and include a physical memory address pointer in the primary key row version directed to the subsequent row in the list of primary key row versions.

5. The computerized database management system according to claim 2, wherein the processor is further configured to:

receive a request to perform a database operation to insert one or more rows of foreign keys into the first table;

scan the first table to locate an appropriate location for the insertion database operation;

allocate memory for supporting physical memory address pointer implementation;

perform the insertion database operation;

create a physical memory address pointer in the foreign key row to be directed to the primary key version element;

validate insertion of the foreign key row by scanning the second table for the corresponding primary key row version; and reference the physical memory address pointer from the corresponding primary key row version to initialize the foreign key row to point to the primary key version element.

6. The computerized database management system according to claim 2, wherein the processor is further configured to:

receive a request to perform a database operation to delete one or more primary key rows in the second table;

scan the primary key rows to identify the primary key row that is subject for deletion;

scan the foreign key rows in the first table to determine that no foreign key rows are referencing the primary key row to be deleted;

mark the primary key row as deleted; and when an oldest transaction in the computerized database management system is younger than a timestamp of the deleted primary key row, remove the deleted primary key row from the list of primary key rows, release memory space associated with the deleted primary key row, and decrement the reference count in the primary key version element by one;

determine that the reference count of the primary key version element associated with the deleted primary key row is zero; and in response to the determination, delete the primary key version element and release memory space associated with the deleted primary key version element.

7. The computerized database management system according to claim 2, wherein the processor is further configured to:

receive a request to perform a database operation to update one or more rows in the second table;

scan the second table to determine which primary key row or rows is stale;

insert the new primary key row into the list of primary key row versions;

update the physical memory address pointer included in the new primary key row to point to the primary key version element;

update the physical memory address pointer included in the primary key version element to point to the new primary key row; and increment the reference count by one.

8. The computerized database management system according to claim 1, wherein the random access memory is non-volatile random access memory.

9. A method for a database server, a processor, and associated random access memory, the method comprising:

configuring an in-memory database in the random access memory to have a first table of a plurality of cells organized into logical rows and logical columns and a second table of a plurality of cells organized into logical rows and logical columns, each of the cells of each of the tables having an associated memory address within the random access memory;

performing an initial scan of the second table to establish a direct table association between a memory address of an origin cell of the plurality of cells of the first table and a memory address of a target cell of the plurality of cells of the second table, the direct table association including at least one physical memory address pointer associated with at least one physical memory address stored on physical hardware, the physical memory address pointer being added to the first table during the initial scan of the second table;

receiving a request to perform a join database operation of one or more rows or columns of the first table including the origin cell on one or more rows or columns of the second table including the target cell, the join database operation being a join database operation on a many-to-many relationship between the first table and the second table, including in the direct table association an intermediate table comprising a plurality of cells organized into logical rows and logical columns, a first physical memory address pointer, and a second physical memory address pointer;

dereferencing the direct table association for the origin cell to obtain a value of the target cell stored at the physical memory address for the target cell;

executing the join database operation using the value, to thereby produce a joined table including the value;

storing the joined table at a new location in the random access memory; and performing subsequent join database operations of the first table on the second table by dereferencing the direct table association that was established via the initial scan of the second table, including the first physical memory address pointer within at least one cell of the plurality of cells of the intermediate table, the first physical memory address pointer pointing to a physical memory address within random access memory that corresponds to a target cell of the plurality of cells of the first table, and including the second physical memory address pointer within at least one cell of the plurality of cells of the intermediate table, the second physical memory address pointer pointing to a physical memory address within random access memory that corresponds to at least one target cell of the plurality of cells of the second table.

10. The method for the database server, processor, and associated random access memory according to claim 9, wherein the row or column containing the origin cell contains a foreign key and the row or column containing the target cell contains a primary key; and the method further comprising:

defining a primary key version element which is configured to include a physical memory address pointer directed to a beginning of a list of primary key row versions, wherein a row of the plurality of rows that contains the target cell is configured to include a physical memory address pointer directed to the primary key version element, and a row of the plurality rows that contains the origin cell is configured to include a physical memory address pointer directed to the primary key version element;

maintaining a reference count to determine how many rows are referencing the primary key version element at a point in time; and executing a join operation on the column containing the foreign key of the first table wherein the foreign key references the physical memory address pointer to the primary key version element, to obtain the primary key value stored in the second table.

11. The method for the database server, processor, and associated random access memory according to claim 10, the method further comprising:

receiving a request to perform an insertion database operation to insert one or more rows of primary keys into the second table;

scanning the second table to locate an appropriate location for the insertion database operation;

allocating random access memory for addition of a new primary key row;

allocating a primary key version element;

performing the insertion database operation;

updating the physical memory address pointer in the primary key version element directed to the list of primary key row versions;

updating the physical memory address pointer in the primary key row version directed to primary key version element; and including a physical memory address pointer in the primary key row version directed to the subsequent row in the list of primary key row versions.

12. The method for the database server, processor, and associated random access memory according to claim 10, to the method further comprising:

receiving a request to perform a database operation to insert one or more rows of foreign keys into the first table;

scanning the first table to locate an appropriate location for the insertion database operation;

allocating memory for supporting physical memory address pointer implementation;

performing the insertion database operation;

creating a physical memory address pointer in the foreign key row directed to the primary key version element;

validating insertion of the foreign key row by scanning the second table for the corresponding primary key row version; and referencing the physical memory address pointer from the corresponding primary key row version to initialize the foreign key row to point to the primary key version element.

13. The method for the database server, processor, and associated random access memory according to claim 10, to the method further comprising:

receiving a request to perform a database operation to delete one or more primary key rows in the second table;

scanning the primary key rows to identify the primary key row that is subject for deletion;

scanning the foreign key rows in the first table to determine that no foreign key rows are referencing the primary key row to be deleted;

marking the primary key row as deleted; and when an oldest transaction in the computerized database management system is younger than a timestamp of the deleted primary key row, removing the deleted primary key row from the list of primary key rows, releasing memory space associated with the deleted primary key row, and decrementing the reference count in the primary key version element by one;

determining that the reference count of the primary key version element associated with the deleted primary key row is zero; and in response to the determination, deleting the primary key version element and releasing memory space associated with the deleted primary key version element.

14. The method for the database server, processor, and associated random access memory according to claim 10, the method further comprising:

receiving a request to perform a database operation to update one or more rows in the second table;

scanning the second table to determine which primary key row or rows is stale;

inserting the new primary key row into the list of primary key row versions;

updating the physical memory address pointer included in the new primary key row to point to the primary key version element;

updating the physical memory address pointer included in the primary key version element to point to the new primary key row; and incrementing the reference count by one.

15. The method for the database server, processor, and associated random access memory according to claim 9, wherein the random access memory is non-volatile random access memory.

* * * * *